Patented June 2, 1931

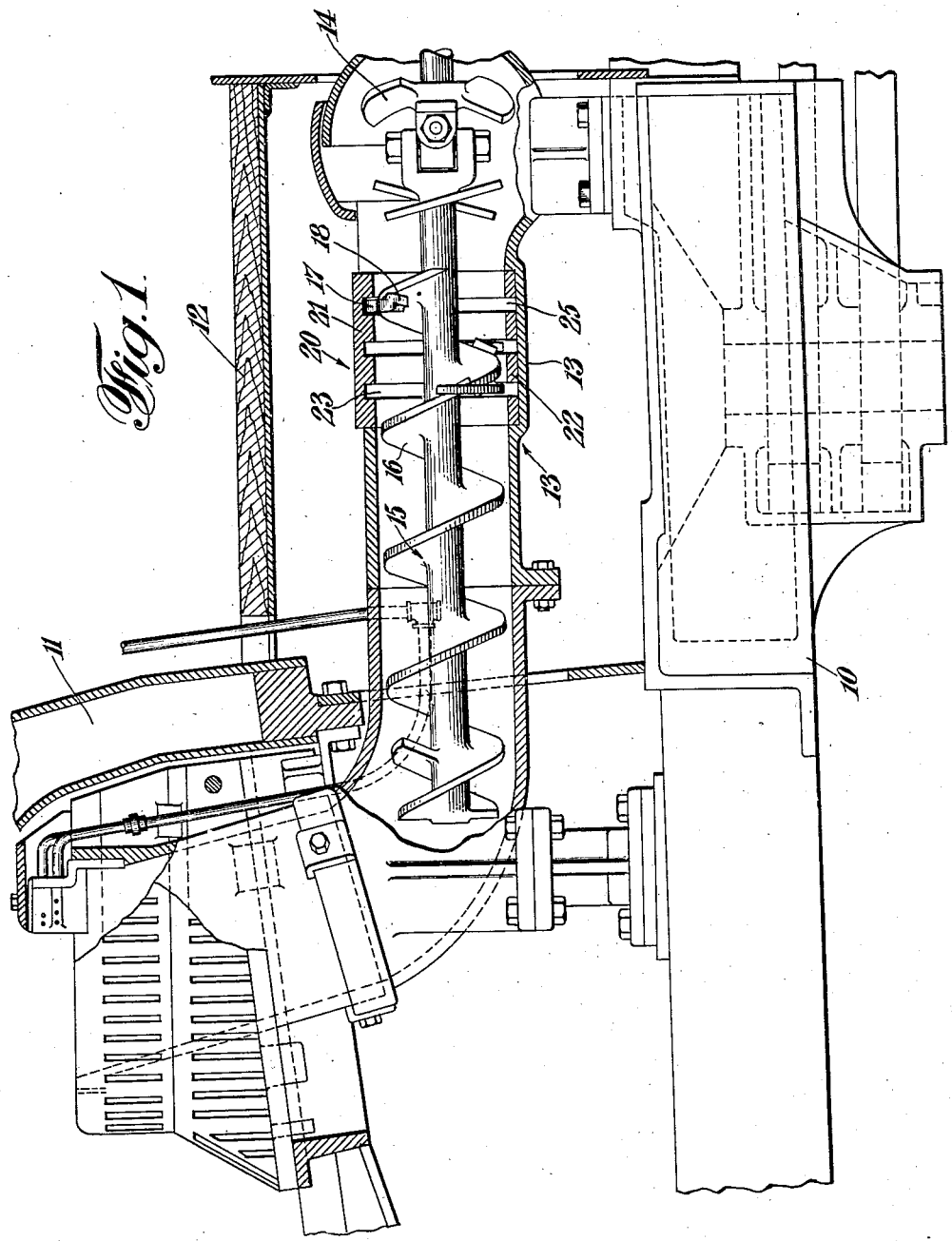

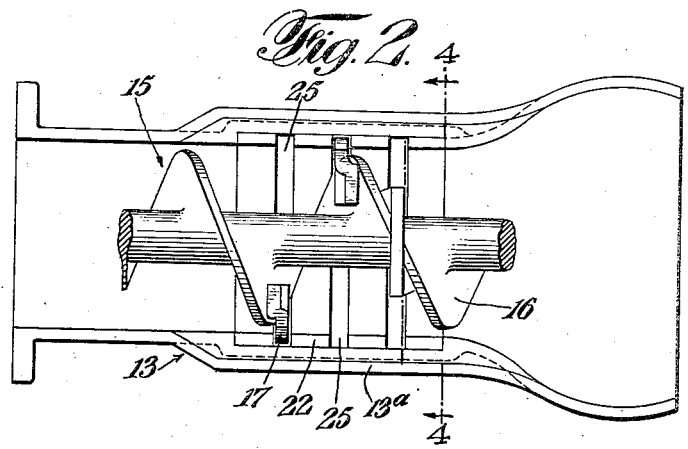
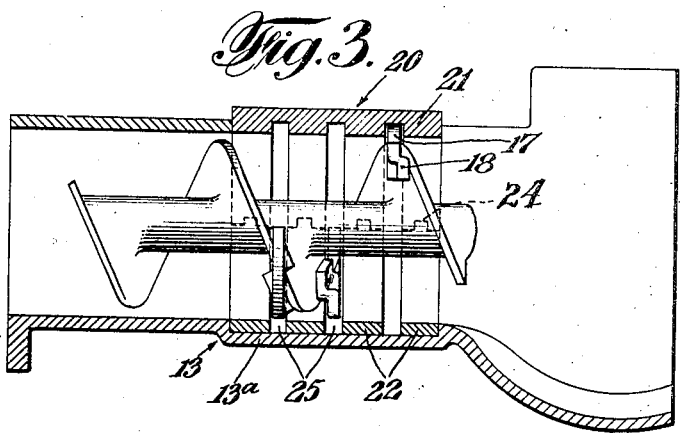
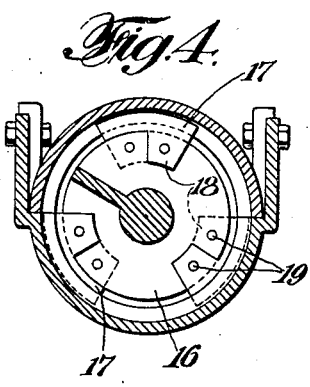
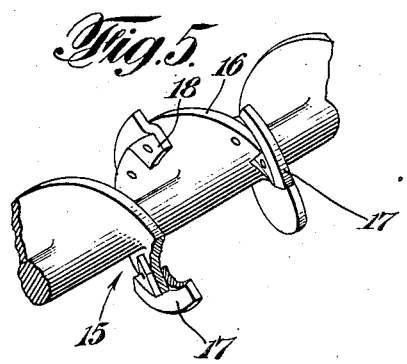

1,807,845

UNITED STATES PATENT OFFICE

ANDREW M. HUNT, OF NEW YORK, N. Y., ASSIGNOR TO THE STANDARD STOKER COMPANY, INCORPORATED, A CORPORATION OF DELAWARE

PERIPHERAL BEARING

Application filed July 14, 1928. Serial No. 292,611.

My invention relates to bearings, and more specifically to bearings for feed or conveyor screws. The general object of the invention is to provide new and improved bearings of the character stated.

To the above and other ends which will subsequently appear, my invention consists in the features of construction, combinations of devices and arrangements of parts hereinafter described and particularly pointed out in the claims.

While my invention is of general application, it was more particularly designed for use in connection with the feed screw of a mechanical stoker; and it has special advantages when so used. In a locomotive stoker of the type where coal is conveyed from the place of storage in the locomotive tender to the place of use in the locomotive boiler by means of a screw conveyor operating in a conduit or housing, the bearings which have heretofore been provided for the screw within the conduit have been subject to various objections. For one thing such bearings act as an obstruction to the fuel or coal in its passage through the conduit. Moreover, they interrupt the continuity of the screw and thereby lessen the efficiency of the feed, and this takes place at the very point where an effective feed is necessary owing to the obstruction interposed by the bearing itself. By my present invention these objections are overcome.

In the present exemplification of the invention the thread or ridge of the screw conveyor is preferably provided at several adjacent points with radial projections which extend outward beyond the threads of the screw and are adapted to engage in curved or circular seats or grooves in the walls of the conduit. The projections and their seats co-operate to provide a bearing which both assists to support the weight of the screw conveyor and also to take up end thrusts during the operation of the stoker. The construction is such that the conduit is left open and unobstructed throughout its length, and the conveyor screw is continuous and uninterrupted.

My invention will be described in detail in connection with the accompanying drawings, wherein Fig. 1 is a fragmentary vertical sectional view taken centrally fore-and-aft of a locomotive stoker embodying one form of the invention, only so much of the stoker and locomotive being shown as is necessary to a full understanding of the invention;

Fig. 2 is a fragmentary plan view showing part of the conduit with the upper portion or half removed to disclose the conveyor screw within;

Fig. 3 is a vertical sectional view taken diametrically of Fig. 2, the upper part of the conduit, however, being shown in place in Fig. 3;

Fig. 4 is a transverse vertical sectional view taken on planes indicated by the interrupted section lines 4, 4 in Fig. 2 and looking in the direction of the arrows at said line, the upper part of the conduit being in place, however, in Fig. 4 also; and Fig. 5 is a fragmentary perspective view of the conveyor screw.

Figs. 2–5 are drawn to a somewhat larger scale than is Fig. 1.

As appears from Fig. 1, the frame of the locomotive indicated generally by the numeral 10 has disposed above it a boiler having a rear water leg 11. Arranged horizontally below the cab deck 12 and extending forward from the locomotive tender (not shown) is a stoker-conduit or housing designated by the numeral 13. Said conduit is supported in part on the locomotive frame 10 and is formed of flexibly connected sections, the forward section having an upwardly extending unobstructed delivery passage terminating in a mouth above the level of the fire. Mounted in the lower or horizontal portion of the conduit 13 is a feed or conveyor screw which is composed of a plurality of sections connected end to end by universal joints, two such sections 14 and 15 being shown herein. The forward screw section 15 terminates at the lower end of the vertically disposed portion of the conduit 13. As thus far described, the parts are of a construction known before my present invention.

In carrying out said invention in the present instance, I provide the thread or ridge 16 of the screw 15 with one or more bearing devices or projections which are in the form of fins, flanges or ribs 17, there being three of such fins shown in the present instance disposed on adjoining portions of the screw thread 16. If desired, the fins may be cast integrally with the screw but as shown herein they are in the form of detachable flang-like members provided with oppositely disposed ears 18 which are adapted to embrace between them the contiguous portion of the rib 16, said ears being perforated to receive securing devices as rivets 19 which pass also through the holes in the rib.

By this means, the flange or body portion of each fin is secured rigidly to the screw in a plane perpendicularly disposed to the axis of the screw. The outer face of the fin is curved or arcuate, the curve being struck from a center on the axis of the screw. Looked at endwise as in Fig. 4 the bearing parts or fins 17 are discontinuous or separated. They are, however, preferably spaced equally apart and so disposed that at least one of them will constantly co-operate with the associate stationary part of the bearing to assist in supporting the screw 15. The stationary bearing part aforesaid, designated as a whole by the numeral 20, is adapted to envelope the screw completely outside of its periphery. While this stationary bearing part 20 may be integral with the housing or conduit 13, it is as herein shown comprised of a number of separated parts, viz.: a top part or half 21 and associate underlying parts or segments 22 of which latter there are four in the present instance. The parts 21 and 22 when assembled together constitute a tubular element or member; and it is to be understood that the reason for making them separate is for convenience in assembling with the screw 15 for which they provide a bearing.

The part 21 is in half-tubular form and its interior is provided with a plurality of parallel seats or grooves 23, three of which are shown in the present instance. The underlying parts or segments 22 which may, if desired, each be interlocked at their ends or engaging faces with the part 21 as indicated at 24, are so spaced apart as to provide grooves or seats 25 which are aligned or in register with the grooves 23 above. The construction is such that when the parts 21 and 22 are assembled, they provide within their circular interior or bore a series of uninterrupted circular parallel grooves or depressions 23, 25 which are adapted to receive and co-operate with the fins 17.

The bearing 20 is received in an opening in the conduit 13 and may be inter-seated with a depression indicated at 13ª in the lower side thereof as clearly shown in Fig. 3. From this figure it will be apparent that the inner face of the depression 13ª provides a bottom for each of the grooves 25. If preferred, each of the segments 22 may be seated in its own individual groove in the conduit 13 in order to prevent lateral relative displacement of the segments 22.

It will be observed that by the employment of this improved bearing the conduit is left free and unobstructed for its full length; that the screw itself is uninterrupted both as to its threads and as to its stem or barrel; and that the bearing is adapted to take up both radial and axial components of forces acting on and reacting with the feed screw or conveyor, or, in other words, the bearing not only supports the weight of the screw but also takes its end thrust. The fins may be regarded as outer rotating parts of the screw, coacting with the relatively stationary bearing element 20, this having a circular bearing portion of greater diameter than the screw itself, providing in effect a stationary curved seat with which the fins successively coact as its lower side. The outer faces of the fins may rest directly on the depressed part 13ª of the conduit, or they may be formed with offsets to engage the edge portions of the segments 22, or other obvious expedients may be resorted to for enabling the bearing to support the weight of the screw, all without departing from the invention.

The bearing sections 22 may be fastened in place in any desired manner as for instance by counter-sunk rivets through the sections and the supporting conduit part 13ª. Various changes besides those specified may be employed within the scope of the present invention.

I claim:

1. In a feed screw device for a stoker, the combination of a screw, a plurality of fins rigid with the screw and disposed in planes at right angles to the screw axis, and parallel stationary seats for said fins.

2. In a feed screw device for a stoker, the combination of a screw, a plurality of fins rigid with the screw and disposed in planes at right angles to the screw axis, and parallel stationary seats for said fins, said seats completely enveloping the screw.

3. In a feed screw device for a stoker, the combination of a screw, a plurality of fins rigid with the screw and disposed in planes at right angles to the screw axis, and parallel stationary seats for said fins, said seats completely enveloping the screw and said fins being discontinuous but disposed so that at least one of them is always in cooperation with a seat to support the weight of the screw.

4. In a feed screw device for a stoker, the combination of a screw, a plurality of fins rigid with the screw and disposed in planes at right angles to the screw axis, and parallel stationary seats for said fins, the screw being horizontally arranged and the fins acting in succession to support its weight.

5. In a feed screw device for a stoker, the combination of a screw provided with separate parts rotative in planes at right angles to the screw axis, and a stationary bearing element with which said parts coact in succession to assist in supporting the weight of the screw.

6. In a stoker, the combination of a conduit, a feed screw therein, a curved bearing on the inner wall of the conduit and provided with a plurality of grooves, and a plurality of projections on the screw extending radially outward and cooperative with the grooves in said bearing.

7. In a locomotive stoker, the combination of a horizontally disposed tubular conduit, a plurality of parallel curved seats on the inner wall thereof, a feed screw rotatable within said conduit, and radial projections on said screw and cooperative with said seats.

8. In a locomotive stoker, the combination of a horizontally disposed tubular conduit, a detachable bearing member supported on said conduit and provided with a plurality of parallel curved seats, a feed screw rotatable within said conduit, and radial projections on said screw each cooperative with one of said seats.

ANDREW M. HUNT.